(12) United States Patent
Davis (10) Patent No.: US 6,854,182 B2
(45) Date of Patent: Feb. 15, 2005

(54) METHOD OF SPRING RATE ADJUSTMENT

(75) Inventor: Michael W. Davis, Rockford, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 10/454,434

(22) Filed: Jun. 4, 2003

(65) Prior Publication Data

US 2003/0208905 A1 Nov. 13, 2003

Related U.S. Application Data

(63) Continuation-in-part of application No. 09/850,681, filed on May 7, 2001, now Pat. No. 6,594,902.

(51) Int. Cl.[7] .......................... B21F 35/00; G11B 21/16
(52) U.S. Cl. ................. 29/896.9; 29/603.03; 360/244.8
(58) Field of Search .......................... 29/896.9, 896.93, 29/603.03, 426.4, 407.05, 401.1; 360/244.8, 104, 244.9

(56) References Cited

U.S. PATENT DOCUMENTS 4,848,557 A * 7/1989 Uchida et al. ............ 192/41 A
6,141,187 A * 10/2000 Wong et al. ............. 360/244.8

* cited by examiner

*Primary Examiner*—Marc Jimenez
(74) *Attorney, Agent, or Firm*—Faegre & Benson, LLP (57) ABSTRACT

A method of controlling the spring rate of a spring region of an unassembled or partially or fully assembled load beam for a disk drive head suspension by providing the spring region with a number of bridges which may then selectively opened to achieve a target spring rate. Adjusting the spring rate in this manner provides control of resulting performance characteristics of the head suspension. In one aspect, a data set of spring rate reductions corresponding to bridge sets removed is predetermined and used with the corresponding type of load beam to determine the bridges to remove to approximate the target spring rate.

20 Claims, 6 Drawing Sheets

METHOD OF SPRING RATE ADJUSTMENT

CROSS-REFERENCE TO RELATED APPLICATION

This is a Continuation-In-Part application of U.S. patent application Ser. No. 09/850,681, filed May 7, 2001, now U.S. Pat. No. 6,594,902, and titled ACTIVE SPRING RATE ADJUST, the entire contents of which are hereby incorporated by reference.

BACKGROUND OF THE INVENTION

The present invention relates to the field of manufacturing head suspensions for magnetic disk drives, more particularly, to adjusting the spring rate for load beams used in such head suspensions. The present invention overcomes shortcomings in the prior art by initially providing a spring region with a plurality of bridges or frets with an initial spring rate greater than a desired spring rate and subsequently adjusting the number of bridges in the spring region of the load beam to approach or equal the desired spring rate and thus reduce the variability in the spring rate of such load beams.

DETAILED DESCRIPTION OF THE INVENTION

Figure 1:
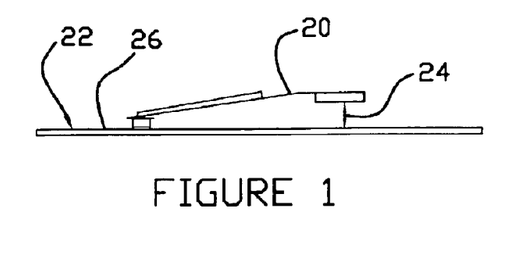
FIG. 1 is a simplified side view of a head suspension in an operating position above a magnetic disk.

Referring to the figures, and most particularly to FIG. 1, a simplified view of a head suspension 20 may be seen positioned above a magnetic disk 22. Suspension 20 is preferably positioned at a nominal total offset distance 24 from a working surface 26 of disk 22. In a finished product, it is to be understood that there is characteristically a "stack up tolerance" in the assembly of parts including the suspension, with respect to the working surface 26. As the nominal total offset distance 24 varies according to process and manufacturing variations, the final gram load for the suspension is affected, because of the change in amount of deflection of the suspension at its "fly height." This follows from the spring formula:

$$F=kx \tag{1}$$

where force "F" equals spring rate "k" times displacement "x." Equation (1) is applicable to the present invention in a rewritten form for head suspensions as:

$$\Delta GL = \Delta SR \times \Delta D \tag{2}$$

where the change in gram load "$\Delta GL$" equals the product of the change in spring rate "$\Delta SR$" times the change in deflection "$\Delta D$" caused by changes in nominal total offset distance variations.

Figure 2:
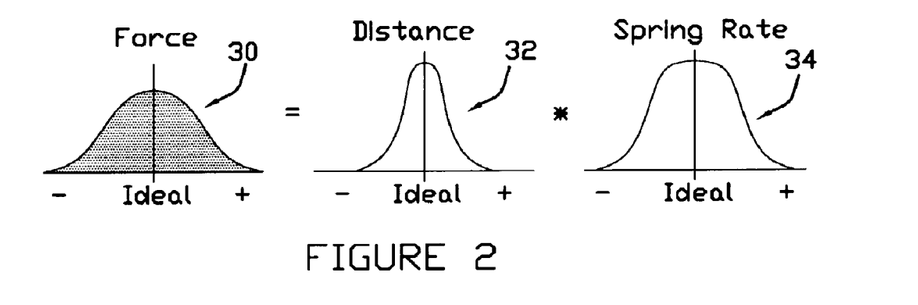
FIG. 2 is a diagram illustrating the effect a wide tolerance on spring rate has on force in a head suspension.

Referring now to FIG. 2, the relationship expressed by Equation (2) may be observed in terms of normal distributions, where the distribution of force "F" 30 is the result of the product of the distribution of distance "x" 32 multiplied by the distribution of spring rate "k" 34. As shown, the mid points of each distribution represent nominal or "ideal" values. As may be seen a relatively wide distribution of spring rate 34 results in a wide distribution of force 30, for a given distribution of distance 32.

Figure 3:
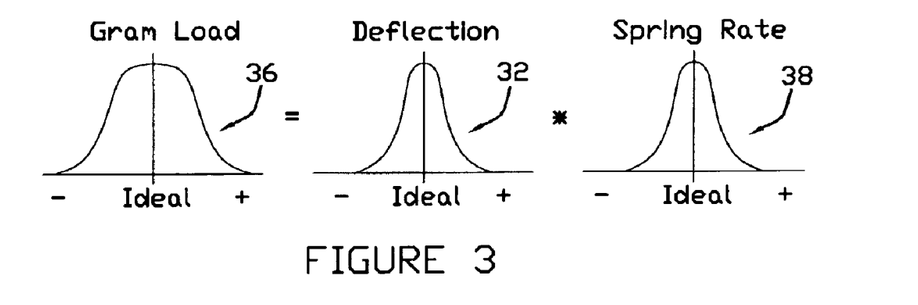
FIG. 3 is a diagram similar to that of FIG. 2, except showing the result of more closely controlling spring rate in a head suspension.

Referring now also to FIG. 3, it may be seen that the distribution of gram load GL 36 may be reduced by reducing the distribution of spring rate SR 38 for the same distribution of distance or deflection 32. Again the "ideal" values are indicated to represent the case with no variation.

Returning to FIG. 2, a numerical example to illustrate the effect of the present invention is as follows. If the distribution of distance 32 has a mean value, $\mu_D$, equal to 2 mm, with one standard deviation, $\sigma_D$, equaling 0.1 mm, and the spring rate distribution 24 has a mean value, $\mu_{SR}$, equal to 18 N/m with one standard deviation of spring rate, $\sigma_{SR}$, equaling 1.5 N/m, then the mean value $\mu_F$ of the distribution of the force 30 is:

$$\mu_F = \mu_D \times \mu_{SR} \tag{3}$$

and, for this example, $\mu_F = 2$ mm×18 N/m=36 mN.

The formula for calculating the standard deviation is:

$$\sigma_F = \mu_F \times [(\sigma_D/\mu_D)^2 + (\sigma_{SR}/\mu_{SR})^2]^{1/2} \tag{4}$$

where $\sigma_F$ is one standard deviation for the force distribution, $\sigma_D$ is one standard deviation for the distance distribution, and $\sigma_{SR}$ is one standard deviation for the spring rate distribution. In the example, $\sigma_F = 0.0036$ N×[(0.0001 m/0.002 m)$^2$+(1.5 N/m/18 N/m)$^2$]$^{1/2}$, resulting in one standard deviation of force equal to 0.00035N or 0.35 mN.

Referring now also to FIG. 3 and keeping the deflection distribution and mean at the same values as given for the distance in FIG. 2, and keeping the same mean spring rate, but with one standard deviation for spring rate tightened to 0.75 N/m, the mean value of the gram load, $\mu_F$, remains the same as that for the force at 36 mN, since $\mu_D$ and $\mu_{SR}$ have not changed. However, using the present invention, one standard deviation, $\sigma_{GR}$, of the gram load distribution, is improved (as compared to the standard deviation $\sigma_F$ of the force distribution) as follows: $\sigma_{GR} = 0.0036$N×[(0.0001 m/0.002 m)$^2$+(0.75 N/m/18 N/m)$^2$]$^{1/2}$, resulting in one standard deviation of gram load equal to 0.00023N or 0.23 mN, an improvement of more than 34% over the result for FIG. 2.

It is believed appropriate to characterize the distributions as having a "normal" or gaussian distribution characteristic since such a characterization is believed to be conservative in that other forms of distribution characteristics are expected to result in a more favorable comparison of the use of the present invention compared to the prior art lacking use of the present invention.

Figure 4:
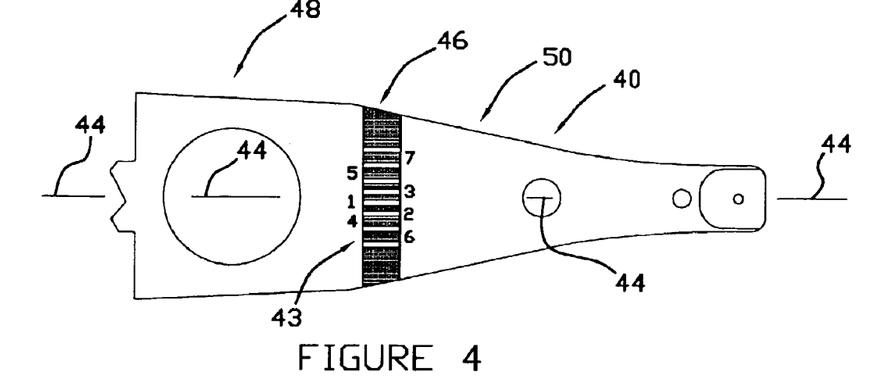
FIG. 4 is a simplified plan view of a load beam useful in the practice of the present invention and having 7 frangible bridges in a spring region of the load beam.
Figure 5:
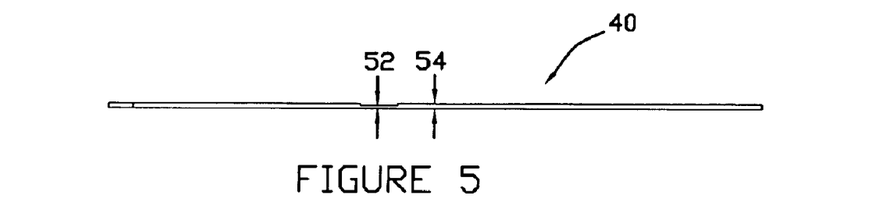
FIG. 5 is a simplified side view of the load beam of FIG. 4.
Figure 6:
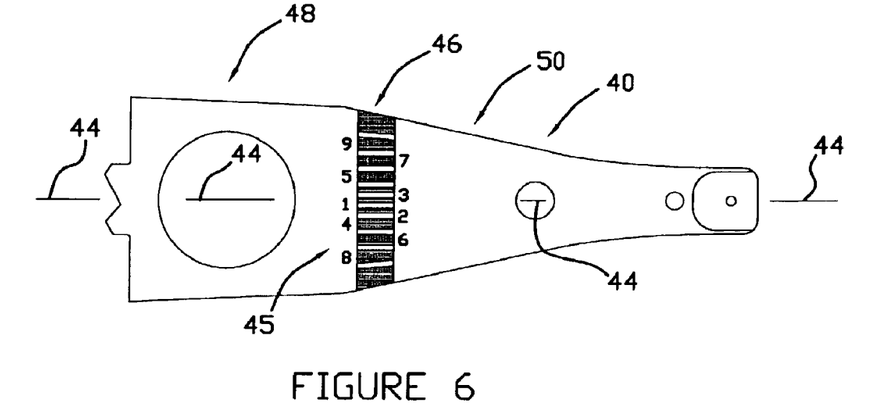
FIG. 6 is a simplified plan view of an alternative embodiment of a load beam useful in the practice of the present invention and having 9 frangible bridges.

Referring now most particularly to FIGS. 4, 5 and 6, two alternative embodiments of load beams having the present invention therein are presented. FIG. 4 is a top view of a first embodiment of a load beam 40 with seven bridges 43 located symmetrically about a longitudinal axis 44 of the load beam 40 in a spring region 46. FIG. 6 is a top view of a second embodiment of the load beam 40 with nine bridges 45. FIG. 5 is a side view applicable to either embodiment. In these embodiments, the bridges are located in the spring region 46 between a mounting region 48 and a rigid region 50 of the load beam. The spring region 46 has a reduced thickness 52, (relative to the material thickness 54 of the load beam adjacent the spring region) preferably formed by partially etching the load beam in the spring region, and further has material entirely removed between respective adjacent bridges.

In the embodiments corresponding to Tables 1 and 2, the bridge widths are as follows: bridges 1, 2, and 3 are each 0.1 mm wide, bridges 4, 5, 6, and 7 are each 0.2 mm wide (for each of the 7 and 9 bridge embodiments). For the 9 bridge embodiment shown in FIG. 6, bridges 8 and 9 are each 0.22 mm wide. In the two example embodiments described herein (the 7 and 9 bridge load beams), all bridges are 0.78 mm long, equal to the length of the spring region in the direction of longitudinal axis 44. However, it is to be understood that the length of the bridges, as well as other dimensions of the load beams are not necessarily limited to those specified herein in order to practice the present invention. The unetched material thickness 54 is 0.1016 mm and the reduced (partially etched) thickness 52 is 0.0275 mm. It is to be understood that these dimensions correspond to the 7 and 9 bridge embodiments presented herein, and that the invention may be practiced with other dimensions. In particular, by way of example and not limitation, the present invention may be practiced on head suspensions that are partially or fully assembled and is applicable to head suspensions having spring regions without etching.

The use of symmetrical incrementally sized bridges are preferable to maximize the adjustment range for a given number of bridges. Actual sizes are dependent on the number of bridges and the degree of precision available in the manufacturing process. It is to be understood that fewer bridges result in less choices, but greater ease of manufacturability. Preferred sizes for the spaces between bridges is dependent upon the tooling used to selectively remove bridges to achieve or approach the spring rate desired.

It is to be understood that the load beam 40 in the embodiment shown is in an early stage of manufacturing in FIGS. 4, 5 and 6, and may undergo substantial additional processing in the course of manufacturing a head suspension assembly. The present invention is directed to reducing the variability of the spring rate of the spring region 46 to reduce the range of variation of parameters (particularly gram load) in the final assembly that are traceable to variability in spring rate of the spring region of the load beam. In the practice of the present invention, the load beam is formed with a spring region having a plurality of bridges parallel to the longitudinal axis of the head suspension. The initial spring rate of the spring region is preferably greater than a desired target spring rate.

Figure 7:
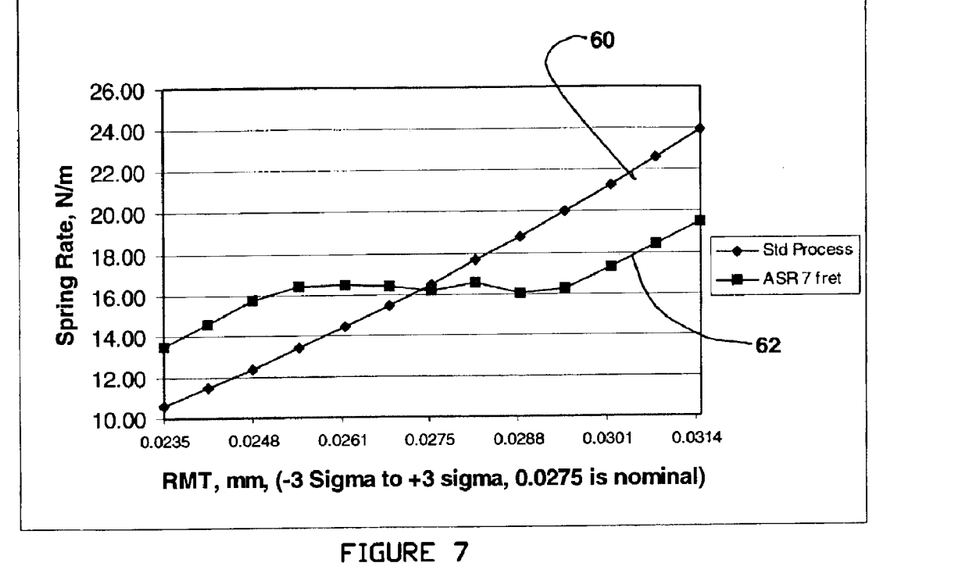
FIG. 7 is a graph showing spring rate versus remaining material thickness in an etched portion of a 7 fret load beam.
Figure 8:
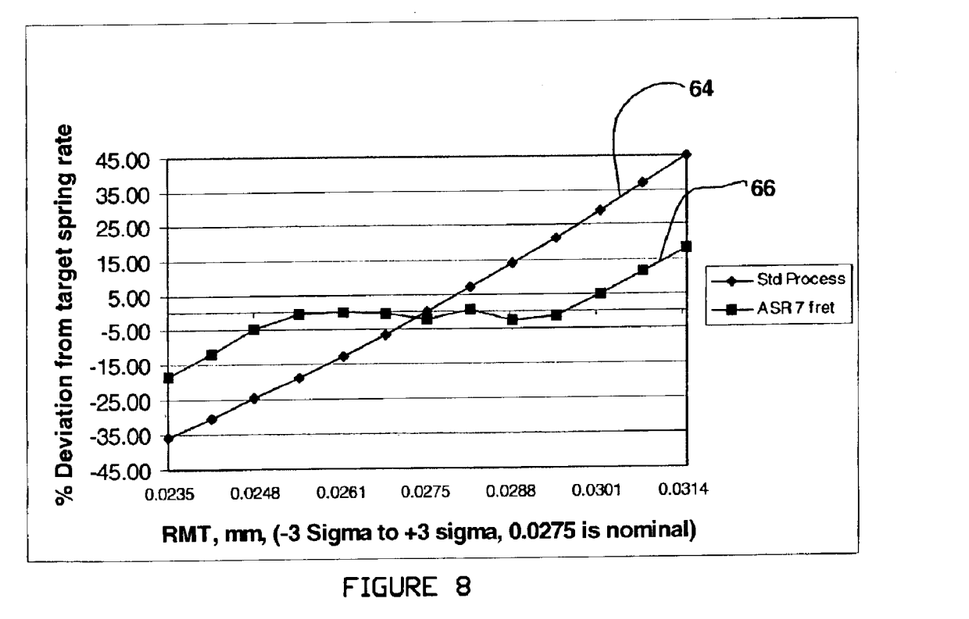
FIG. 8 is a graph showing percent deviation from a target spring rate versus remaining material thickness in an etched portion of a 7 fret load beam.

Referring now to FIGS. 7 and 8, for the partially etched embodiment of the present invention, graphs of spring rate versus remaining material thickness (material left in the spring region 46, after partial etching of the load beam) may be seen. FIG. 7 illustrates the improvement obtained by the present invention in terms of the reduction in variability of actual spring rate in Newtons/meter. The remaining material thickness, RMT, corresponding to reduced thickness 52 in FIG. 5, is given in millimeters, with a spread of ±3 σ (sigma, or standard deviation) about a nominal reduced thickness 52 of 0.0275 mm. The target spring rate for the 7 fret version is 16.25 N/m. As may be seen, the 7 fret version of the load beam may be adjusted by removal of frets symmetrically about the longitudinal axis 44 to maintain the spring rate between 12 and 20 N/m in comparison to the prior art spring rate variability of between 10 and 24 N/m. Curve 60 gives the performance of the prior art, while curve 62 illustrates the operation of the present invention. FIG. 8 shows the same data except with the spring rate expressed as a percentage deviation from the target spring rate. Curve 64 gives the performance of the prior art, while curve 66 illustrates the operation of the present invention. Here the deviation may be seen to be reduced by the present invention from a range of 80% (−35% to +45%) for the prior art, to a range of less than 50% (−25% to +25%). It maybe further noted that 86.6% of the parts shown in FIGS. 7 and 8 are within ±5% of nominal (assuming a normal distribution). Table 1 gives the actual numerical data for FIGS. 7 and 8.

TABLE 1

| St Dev (Sigma) | "As Etched" Target Thickness | "As Etched" S.R. | % over ASR Orig S.R. | Target | Frets Removed 1 | 2 | 3 | 4 | 5 | 6 | Final ASR Target | Final S.R. ASR |
|---|---|---|---|---|---|---|---|---|---|---|---|---|
| +3 | 0.0315 | 20.9 | 30.33 | 45.60 | X | X | X | X | X | X | X | 16.5 | 19.51 |
| +2.5 | 0.03084 | 20.9 | 28.66 | 42.43 | X | X | X | X | X | X | X | 16.5 | 18.41 |
| +2 | 0.03017 | 20.9 | 27.004 | 38.90 | X | X | X | X | X | X | X | 16.5 | 17.32 |
| +1.5 | 0.02950 | 20.9 | 25.41 | 35.06 | X | X | X | X | X | X | X | 16.5 | 16.27 |
| +1 | 0.02883 | 20.9 | 23.857 | 30.84 | | X | X | X | X | X | X | 16.5 | 16.064 |
| +5 | 0.02817 | 20.9 | 22.384 | 26.29 | | | | X | X | X | X | 16.5 | 16.54 |
| Nominal | 0.0275 | 20.9 | 20.94 | 21.20 | X | X | X | X | X | | | 16.5 | 16.16 |
| −.5 | 0.02685 | 20.9 | 19.59 | 15.77 | X | | | X | X | | | 16.5 | 16.4 |
| −1 | 0.0262 | 20.9 | 18.3 | 9.84 | X | X | X | | | | | 16.5 | 16.521 |
| −1.5 | 0.02552 | 20.9 | 16.993 | 2.90 | X | | | | | | | 16.5 | 16.44 |
| −2 | 0.02483 | 20.9 | 15.73 | −4.90 | | | | | | | | 16.5 | 15.73 |
| −2.5 | 0.02417 | 20.9 | 14.57 | −13.25 | | | | | | | | 16.5 | 14.57 |
| −3 | 0.0235 | 20.9 | 13.45 | −22.68 | | | | | | | | 16.5 | 13.45 |

Figure 9:
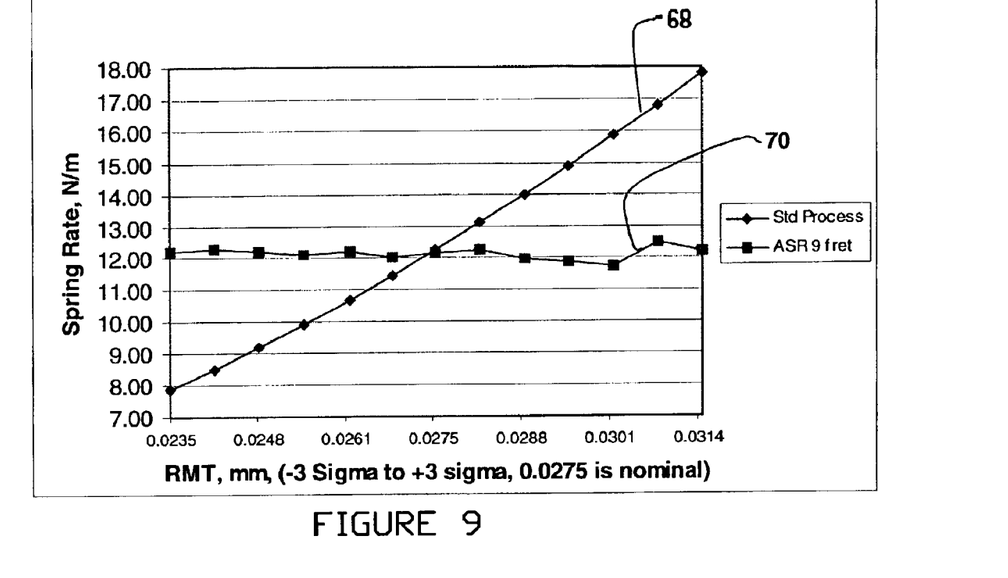
FIG. 9 is a graph showing spring rate versus remaining material thickness in an etched portion of a 9 fret load beam.
Figure 10:
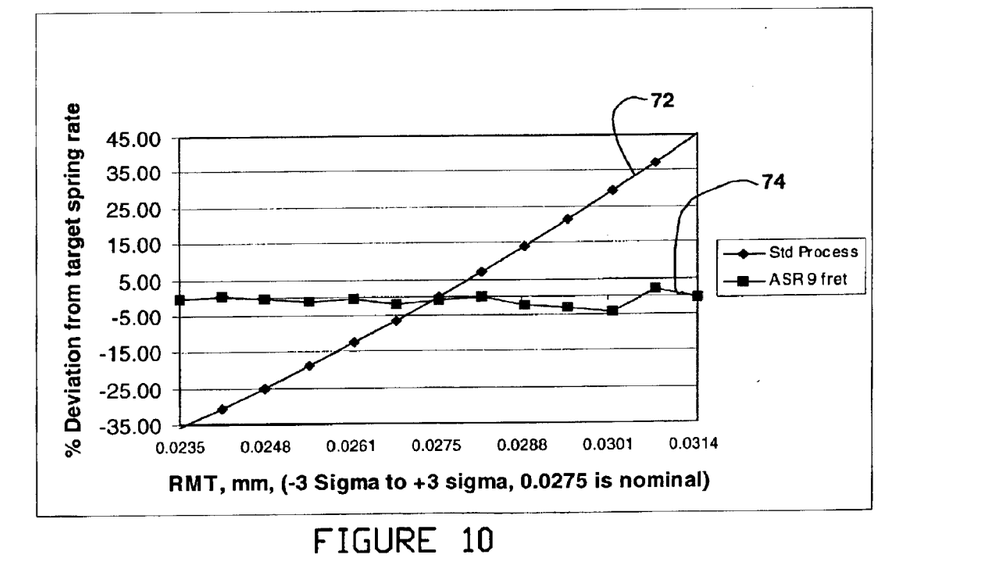
FIG. 10 is a graph showing percent deviation from a target spring rate versus remaining material thickness in an etched portion of a 9 fret load beam.

Adding an additional pair of frets to adjust spring rate gives the results indicated in FIGS. 9 and 10, which show the same type of data illustrated for the 7 fret load beam in FIGS. 7 and 8. In FIGS. 9 and 10 the target spring rate is 12.5 N/m. In FIG. 9, a variability in spring rate for the reduced thickness 52 (without fret adjustment) of the spring region 46 is between 8 and 18 N/m, or expressed in percentages, between about −35% and +45%, an 80% range. In FIG. 9, curve 68 gives the performance of the prior art, while curve 70 illustrates the operation of the present invention. In FIG. 10, curve 72 gives the performance of the prior art, while curve 74 illustrates the operation of the present invention.

The present invention allows a reduction to a range of variability of spring rate between 11 and 13 N/m, or less than ±5% of the desired or target spring rate. It is to be noted that substantially all of the parts are within ±5% of the target rate. Table 2 gives the actual data for FIGS. 9 and 10.

TABLE 2

| Std Dev (Sigma) | Thickness | "As Etched" Target S.R. | "As Etched" Orig S.R. | % over ASR Target | \multicolumn{9}{c}{Frets Removed} | Final ASR Target | Final ASR Target |
|---|---|---|---|---|---|---|---|---|---|---|---|---|---|---|---|
| | | | | | 1 | 2 | 3 | 4 | 5 | 6 | 7 | 8 | 9 | | |
| +3 | 0.0315 | 20.4 | 27.741 | 55.84 | x | x | x | x | x | x | x | x | x | 12.5 | 12.190 |
| +25 | 0.03084 | 20.4 | 26.192 | 53.23 |   | x | x | x | x | x | x | x | x | 12.5 | 12.486 |
| +2 | 0.03017 | 20.4 | 24.668 | 50.34 |   | x | x | x | x | x | x | x | x | 12.5 | 11.735 |
| +1.5 | 0.02950 | 20.4 | 23.194 | 47.18 | x |   |   | x | x | x | x | x | x | 12.5 | 11.888 |
| +1 | 0.02883 | 20.4 | 21.769 | 43.73 |   |   |   | x | x | x | x | x | x | 12.5 | 11.951 |
| +5 | 0.02817 | 20.4 | 20.414 | 39.99 | x | x | x | x | x | x | x |   |   | 12.5 | 12.240 |
| Nominal | 0.0275 | 20.4 | 19.089 | 35.83 |   | x | x | x | x | x | x |   |   | 12.5 | 12.142 |
| −.5 | 0.02685 | 20.4 | 17.851 | 31.38 | x |   |   | x | x | x | x |   |   | 12.5 | 12.004 |
| −1 | 0.0262 | 20.4 | 16.662 | 26.48 | x | x | x |   |   |   |   | x | x | 12.5 | 12.209 |
| −1.5 | 0.02552 | 20.4 | 15.468 | 20.80 |   | x | x |   |   | x | x |   |   | 12.5 | 12.105 |
| −2 | 0.02483 | 20.4 | 14.31 | 14.40 |   |   |   | x | x |   |   |   |   | 12.5 | 12.228 |
| −2.5 | 0.02417 | 20.4 | 13.252 | 7.56 | x | x |   |   |   |   |   |   |   | 12.5 | 12.298 |
| −3 | 0.0235 | 20.4 | 12.227 | −0.19 |   |   |   |   |   |   |   |   |   | 12.5 | 12.227 |

Figure 11:
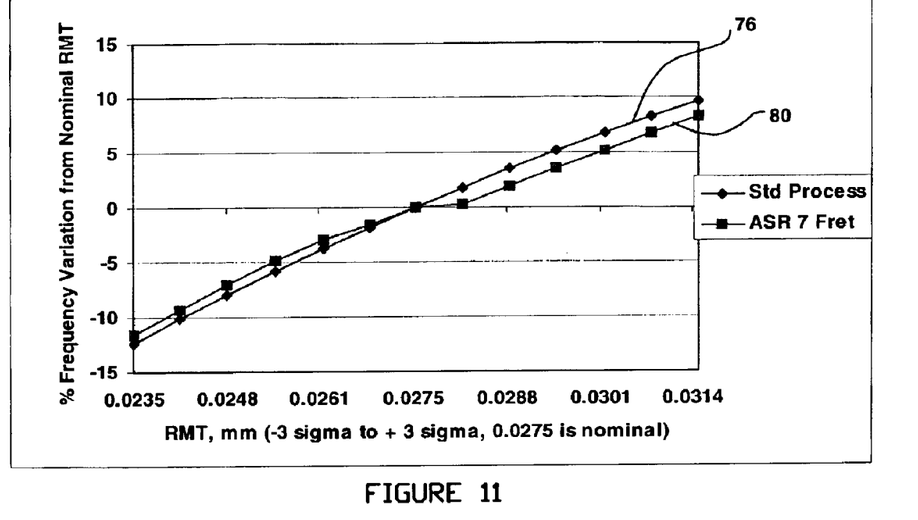
FIG. 11 is a graph showing percent frequency variation of a first torsional frequency variation versus remaining material thickness in an etched portion of a 7 fret load beam.
Figure 12:
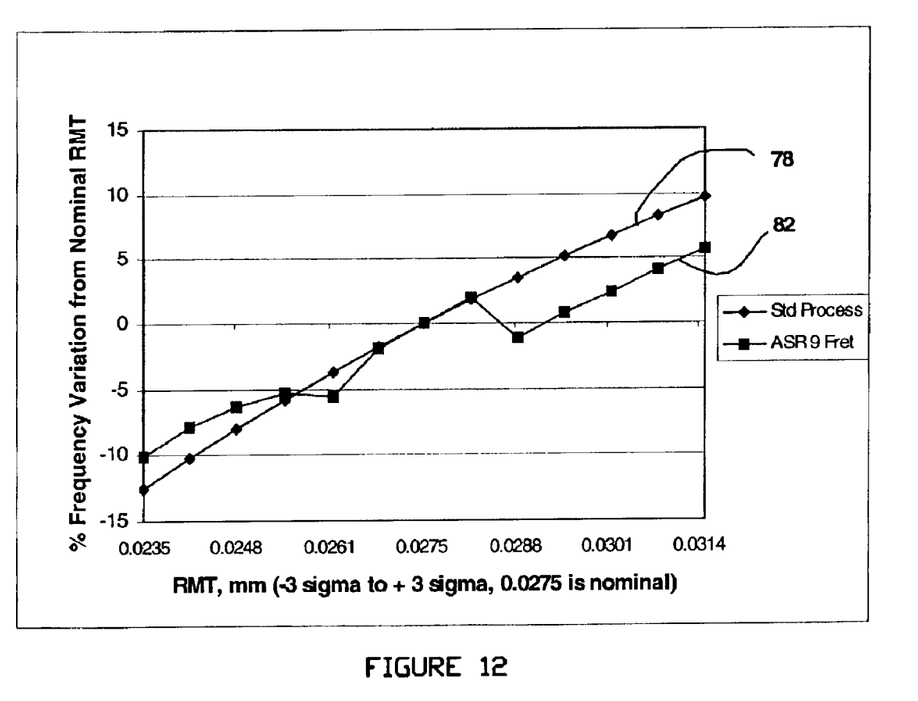
FIG. 12 is a graph showing percent frequency variation of a first torsional frequency variation versus remaining material thickness in an etched portion of a 9 fret load beam.

Referring now to FIGS. 11 and 12, it may be seen that there is a slightly improved resonance variation using the present invention, with the most pronounced improvements at the "tails" of the ±3σ distributions. Curves 76 and 78 illustrate the performance of the prior art, while curves 80 and 82 illustrate the frequency effects of the present invention. It is to be understood that the present invention may be used to "tune" the first torsional resonant frequency, if desired, rather than be directed to spring rate variability reduction. It may thus be seen that bridge sets may be sized to cover a predetermined range with respect to a nominal spring rate or with respect to a desired target spring rate. The bridge sets may be sized to cover a range of about ± one standard deviation from a nominal spring rate in a normal distribution centered on the nominal spring rate. Alternatively, the bridge sets may be sized to cover a range of about ± three standard deviations from a nominal spring rate in a normal distribution centered on the nominal spring rate. Furthermore, the bridges are preferably sized to permit a predetermined minimum adjustment increment in the spring rate adjustments obtainable by selection of one bridge from among the sets of bridges.

To carry out the practice of the present invention, initially a table of values is created for each type or size of product to be manufactured. Table 3 lists the % reduction in spring rate corresponding to every practical combination of bridges removed, it being understood that "practical" combinations ordinarily will be limited to laterally symmetrical bridge removal combinations, i.e., the same size bridge is ordinarily removed on both sides and at identical distances from the longitudinal axis to avoid distortion in the static attitude and imbalance in the lateral proportionality of spring rate in the spring region after removal of bridges. Table 3 is thus a data set of values for a particular type or model of load beam, with individual spring rate reductions associated with respective bridge sets removed. As may be seen, Table 3 includes a predetermined minimum increment of 3.2% selectable by including bridge 1 or not.

TABLE 3

| Bridges Removed | % Spring Rate Reduction |
|---|---|
| 1 | 3.2 |
| 2 + 3 | 6.4 |
| 1 + 2 + 3 | 9.7 |
| 4 + 5 | 13 |
| 1 + 4 + 5 | 16.2 |
| 2 + 3 + 4 + 5 | 19.5 |
| 1 + 2 + 3 + 4 + 5 | 22.8 |

TABLE 3-continued

| Bridges Removed | % Spring Rate Reduction |
|---|---|
| 4 + 5 + 6 + 7 | 26.2 |
| 1 + 4 + 5 + 6 + 7 | 29.5 |
| 2 + 3 + 4 + 5 + 6 + 7 | 32.9 |
| 1 + 2 + 3 + 4 + 5 + 6 + 7 | 36.2 |

Information such as is contained in Table 3 is useful a method for predicting a reduction in variation of spring rate of a particular type of load beam of the type having a longitudinal axis by: forming a set of data pairs in which individual predetermined spring rate reductions are associated with respective sets of bridges to be removed from a particular type of load beam; forming a load beam of that particular type having a spring region and a plurality of bridges in the spring region determining an initial spring rate of the load beam; and determining the number of bridges to open to adjust the spring rate to approach a desired target spring rate, by selecting one data pair from the set of data pairs. Alternatively, to determine the number of bridges to open, a table of values containing a plurality of incremental spring rate adjustments individually associated with respective bridges may be used. Generally in this alternative, it will be preferable to select at least a pair of substantially identical bridges for opening, with each of the bridges of the pair selected located symmetrically on opposite sides of the longitudinal axis of the load beam. Furthermore, the method described above may include making a determination to not remove bridges when the initial spring rate is less than or equal to the desired target spring rate. In determining the number of bridges to open, it is understood that, in one aspect, the method may include selecting a single bridge laterally centered in the load beam. More generally, however, it will be the situation that one data pair will be selected which will result in a spring rate that most closely approximates the desired spring rate, either alone or in conjunction with an additional constraint that the result also not fall below the desired spring rate. As may be clearly seen, selecting a particular set of bridges to remove will correspond to a desired spring rate reduction from among the data sets formed in this method.

To carry out adjustment of a particular load beam product, it is preferred to actively determine the initial or unadjusted spring rate of each individual part. This can be done by measuring the remaining material thickness 52 (for partial etched radius products) and calculating a spring rate from that information, knowing the characteristic material from which the part is made. For unetched parts, the spring rate is calculated from the base material thickness. Alternatively, one can actively directly measure the initial spring rate for each part. This can be done as a process step (after initial etching, for etched parts) or later in the manufacturing process, for example, after welding additional components to the load beam, to account for spring rate variations introduced by such additional manufacturing steps. Thus the determination of the actual initial spring rate of the spring region of the load beam can be performed by measuring a parameter of the load beam which is predictive of the initial spring rate, or it can be determined by measuring a sample part and calculating a spring rate for parts corresponding to the sample part.

Once the (initial) spring rate is determined, a comparison is made with the desired or target spring rate, and a "% over target" value is calculated as the amount (in percent) that the initial spring rate is greater than the target spring rate. The percentage is compared to the values in Table 3 for that product, and an appropriate set of bridges is selected to most closely match the desired % spring rate reduction needed to adjust the initial spring rate to equal or approximate the desired or target spring rate. For example, if the initial spring rate is 20% over the target spring rate for a product corresponding to Table 3, either of two sets of bridges may be removed. Removing the set of bridges [2+3+4+5] will reduce the spring rate by 19.5%, resulting in a slightly high final spring rate, 0.5% over the target spring rate. Additionally removing bridge 1 will reduce the spring rate by 22.8%, resulting in a slightly low final spring rate, 2.8% under the target spring rate. It may thus be seen that the desired target spring rate can be closely approached or equaled by removing at least one bridge, a pair of bridges, or a larger combination of bridges. The minimum incremental spring rate adjustment can correspond to removal of a single bridge, or to at least a pair of bridges.

It is to be understood that in the practice of the present invention, each type of load beam product would preferably be characterized by its own particular Table 3. As is readily apparent, the choice of which bridge set to remove can be easily automated in the production process.

Referring now back to Table 1, at −0.5σ, in this instance the % over ASR target was 15.8%. Referring to Table 3, the closest match is the removal of bridge set [1+4+5]. It may be noted that the only options listed in Table 3 are ones that result in a laterally symmetrical part. While it is possible to provide for additional bridge set removals, such sets would result in a laterally non-symmetric spring operation, generally resulting in unacceptable suspension attributes. It is to be further noted that Table 1 indicates removal of bridge set [2+3+4+5+6+7] resulting in a 32.9% spring rate reduction, while removal of bridge set [1+4+5+6+7] would have resulted in a reduction of 29.5%, obtaining a closer approximation to the target spring rate, but with the consequence of ending up below the target spring rate with the larger reduction.

It is to be understood that the specific spring rate reduction associated with each particular bridge set removal is preferably determined by actual testing to develop the database of respective data sets such as that in Table 3. The present invention may thus be used to provide a spring region with a plurality of bridges which include a range of sizes of bridges having minimum and maximum incremental spring rate adjustments which correspond to the range of sizes of the bridges in the spring region.

In addition to the manufacturing process development and execution described above, it is also of interest to review the increase in radius stress resulting from the use of the present invention. Turning now to Table 4, the most extreme condition was investigated for radius stress for a partially etched part. Table 4 illustrates a condition for the 9 bridge version with all 9 bridges removed, thus providing the greatest stress on the radius region. In this testing, it may be seen that there is only a slight increase in radius stress resulting from the implementation of the present invention in controlling spring rate in load beams, in comparison to the stress due to etch variation alone.

TABLE 4

| Standard Deviation σ | Thickness mm | Original Condition Max Stress for 0.1 lift* | Stress Increase % | Present Invention Max Stress for .1 lift | Stress Increase % |
|---|---|---|---|---|---|
| +3 | 0.0315 | $5.23 \times 10^4$ | 11.127 | $5.33 \times 10^4$ | 13.139 |
| Nominal | 0.0275 | $4.71 \times 10^4$ | 0.000 | $4.71 \times 10^4$ | 0.000 |

*Note:
The "0.1 lift" is a 0.1 mm back bend at the load point.

Figure 13:
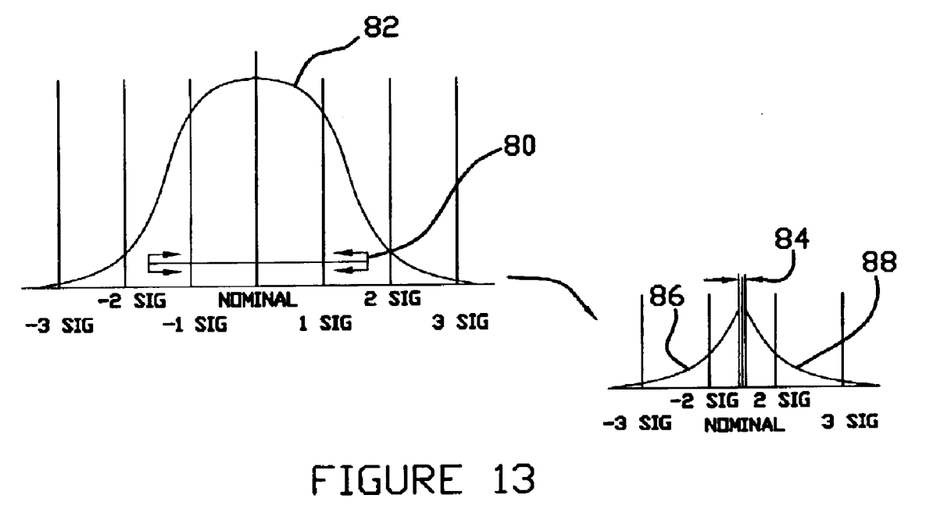
FIG. 13 is a pair of graphs showing normal distribution of a 7 fret version of the present invention, along with the statistical "capture band" of coverage of this version for a population of load beams to which the present invention is applicable.
Figure 14:
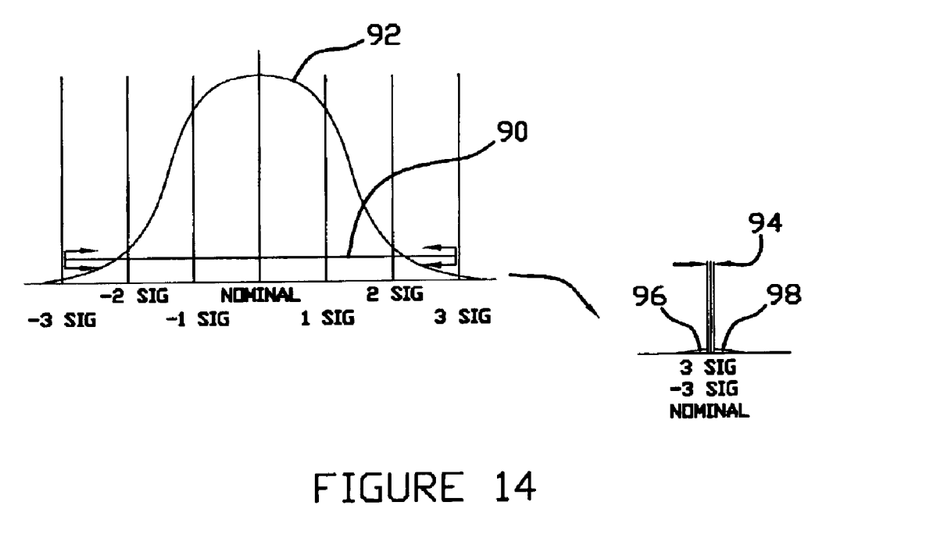
FIG. 14 is a pair of graphs showing normal distribution of a 9 fret version of the present invention, along with the statistical "capture band" of coverage of this version for a population of load beams to which the present invention is applicable.

Now referring to FIG. 13, it may be seen that using the 7 fret partially etched spring region will enable precise adjustment of the spring rate within the range of ±1.5 σ indicated by the device 80 in the gaussian distribution 82, "capturing" 86.6% of the population of load beams indicated by capture band 84, while the remaining population falls within the "tails" 86, 88 outside the capture band 84. Referring now most particularly to FIG. 14, the 9 fret version will capture over 99% of the product population within a ±3σ range indicated by device 90 in distribution 92. This, in effect, "compresses" the distribution into a much "tighter" capture band 94 or package, with only very little remaining in tails 96, 98. Stated another way, it has been observed that the 9 fret version the total population is within ±5% of the target spring rate, or a spring rate variation of 1σ=0.195.

This invention is not to be taken as limited to all of the details thereof as modifications and variations thereof may be made without departing from the spirit or scope of the invention. For example, and not by way of limitation, it is to be understood to be within the scope of the present invention to vary the dimensions of the material thickness and the reduced thickness area of the load beam, and further, either independently, or in combination therewith, to vary the number, size and spacing of the bridges in the spring region of the load beam without departing from the practice of the present invention. As a further example, still not by way of limitation, it is within the scope of the present invention to store actual values rather than percentage values in the respective data sets according to Table 3.

It is to be understood that the present invention is applicable to four piece head suspension designs having separate parts for the load beam, base plate, flexure and hinge or spring region, as well as being applicable to three piece designs having only a load beam, base plate and flexure. Furthermore, the present invention is applicable to laminated load beam designs, i.e., integrated lead suspensions.

What is claimed is:

1. A method for controlling the variation in spring rate of a spring region of a head suspension having a longitudinal axis comprising the steps of:
   a. forming a load beam with a spring region having a plurality of bridges parallel to the longitudinal axis and an initial spring rate greater than a desired target spring rate;
   b. determining an actual initial spring rate of the spring region of the load beam; and
   c. removing at least one bridge to reduce the spring rate to closely approach or equal the desired target spring rate.

2. The method of claim 1 wherein the initial spring rate is greater than a minimum incremental spring rate adjustment above the desired target spring rate.

3. The method of claim 2 wherein the minimum incremental spring rate adjustment corresponds to removing a single bridge.

4. The method of claim 2 wherein the minimum incremental spring rate adjustment corresponds to removing at least a pair of bridges.

5. The method of claim 1 wherein the plurality of bridges include a range of sizes of bridges having a minimum and a maximum incremental spring rate adjustments corresponding respectively thereto.

6. The method of claim 1 wherein step b. is performed by measuring a parameter of the load beam which is predictive of the initial spring rate.

7. The method of claim 1 wherein step b. is performed by measuring a sample part and calculating a spring rate for parts corresponding to the sample part.

8. The method of claim 1 wherein the step c. further comprises removing at least a pair of bridges.

9. A method for predicting a reduction in variation of spring rate between an actual initial spring rate and a desired target spring rate for of a particular type of load beam of the type having a longitudinal axis comprising the steps of:
   a. forming a set of data pairs in which individual predetermined spring rate reductions are associated with respective sets of bridges to be removed from a particular type of load beam;
   b. forming a load beam of that particular type having a spring region and a plurality of bridges in the spring region;
   c. determining an actual initial spring rate of the load beam; and
   d. determining the number of bridges to open to adjust the actual initial spring rate to approach a desired target spring rate, by selecting one data pair from the set of data pairs formed in step a.

10. The method of claim 9 wherein step d. includes using a table of values containing a plurality of incremental spring rate adjustments individually associated with respective bridges.

11. The method of claim 10 wherein step d. further includes selecting at least a pair of substantially identical bridges for opening, with each of the bridges on opposite sides of the longitudinal axis of the load beam.

12. The method of claim 9 wherein step d. further includes making a determination to not remove bridges when the initial spring rate is less than or equal to the desired target spring rate.

13. The method of claim 9 wherein step d. includes selecting a single bridge laterally centered in the load beam.

14. The method of claim 9 wherein step d. further includes selecting the one data pair that will result in a spring rate that most closely approximates the desired spring rate.

15. The method of claim 9 wherein step d. further includes selecting the one data pair that will result in a spring rate that most closely approximates the desired spring rate while also not falling below the desired spring rate.

16. The method of claim 9 wherein step d. further comprises selecting a particular set of bridges to remove corresponding to a desired spring rate reduction from among the data sets formed in step a.

17. The method of claim 9 wherein the bridge sets are sized to cover a predetermined range with respect to the desired target spring rate.

18. The method of claim 9 wherein the bridge sets are sized to cover a range of about ± one standard deviation from a nominal spring rate in a normal distribution centered on the nominal spring rate.

19. The method of claim 9 wherein the bridge sets are sized to cover a range of about ± three standard deviations from a nominal spring rate in a normal distribution centered on the nominal spring rate.

20. The method of claim 9 wherein the bridges are sized to permit a predetermined minimum adjustment increment in the spring rate adjustments obtainable by selection of one bridge from among the Sets of bridges.

* * * * *